United States Patent
Wahlström

(10) Patent No.: US 8,473,014 B2
(45) Date of Patent: Jun. 25, 2013

(54) PORTABLE COMMUNICATION DEVICE INCLUDING DISPLAY WITH IMAGE LIFTER

(75) Inventor: Per Wahlström, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 585 days.

(21) Appl. No.: 11/278,843

(22) Filed: Apr. 6, 2006

(65) Prior Publication Data

US 2007/0237515 A1    Oct. 11, 2007

(51) Int. Cl.
*H04M 1/00*    (2006.01)

(52) U.S. Cl.
USPC ............................ 455/575.1; 455/550.1

(58) Field of Classification Search
USPC ................. 455/575.1–575.3, 550.1
See application file for complete search history.

(56) References Cited

U.S. PATENT DOCUMENTS

| | | | | |
|---|---|---|---|---|
| 3,937,561 | A * | 2/1976 | Peterson et al. | 349/159 |
| 5,442,467 | A | 8/1995 | Silverstein et al. | |
| 5,465,315 | A * | 11/1995 | Sakai et al. | 385/116 |
| 6,016,189 | A * | 1/2000 | Ueda | 355/402 |
| 6,487,351 | B1 | 11/2002 | Cryan et al. | |
| 7,359,740 | B2 * | 4/2008 | Okuzako et al. | 455/575.3 |
| 2002/0158812 | A1 | 10/2002 | Pallakoff | |
| 2003/0012532 | A1 | 1/2003 | Prigent | |
| 2005/0041009 | A1 * | 2/2005 | Kuroda | 345/102 |
| 2006/0039244 | A1 | 2/2006 | Gyger et al. | |
| 2007/0097108 | A1 * | 5/2007 | Brewer | 345/204 |
| 2009/0102744 | A1 * | 4/2009 | Ram | 345/1.1 |

FOREIGN PATENT DOCUMENTS

EP    0 747 738    12/1996

OTHER PUBLICATIONS

International Preliminary Report on Patentability for International Application No. PCT/IB2006/002708 dated Jul. 8, 2008.
International Search Report and Written Opinion for International Application No. PCT/IB2006/002708 dated Jan. 31, 2007.

* cited by examiner

*Primary Examiner* — Charles Appiah
*Assistant Examiner* — Emem Stephen
(74) *Attorney, Agent, or Firm* — Renner, Otto, Boisselle & Sklar, LLP

(57) ABSTRACT

A display for a portable communication device includes an image-forming device that provides an image in a first image plane and an image-shifting device that shifts the image to a second image plane. The image-shifting device brings a displayed image to a surface of the portable communication device, thereby improving the viewing angle for images displayed on the display.

13 Claims, 5 Drawing Sheets

PORTABLE COMMUNICATION DEVICE INCLUDING DISPLAY WITH IMAGE LIFTER

TECHNICAL FIELD OF THE INVENTION

The present invention relates generally to portable communication devices, and more particularly, to a portable communication device including a display with an image-lifting device.

DESCRIPTION OF RELATED ART

In recent years, portable communication devices, such as mobile phones, personal digital assistants, mobile terminals, etc., continue to grow in popularity. As the popularity of portable communication devices continues to grow, the applications for and features of portable communication devices continues to expand. Portable communication devices are appealing to users because of their capability to serve as powerful communication, data service and entertainment tools. Most portable communication devices include a display on which a variety of text and graphics are displayed. In recent times, portable communication devices have been used to display email messages, pictures, video clips and interactive software used in conjunction with recorded and played media.

FIG. 1 depicts a conventional display 10 employed in a typical portable communication device. Conventional displays typically include an image-forming device 12, such as a liquid crystal display, and a protective front or top window portion 14, which typically is made of a plastic material. An air gap 16 exists between the window portion 14 and the image-forming device 12. In this configuration, images on the image-forming device 12 are depicted in an image plane 18 that is below the window portion. Users perceive these images as being "down in the phone." A potential drawback of this conventional configuration is that the viewing angle of the display is somewhat limited. This could result in degraded image viewing when the user is not looking directly down into the display area of the portable communication device.

In addition, as portable communication devices become more compact, while providing greater functionality and display features, a premium is placed on the display size of the device.

SUMMARY

In view of the foregoing, a need exists for a portable communication device having a display that improves viewing angle. A further need exists for a portable communication device having optimized display performance and design. The present invention provides a display including an image lifting device that improves viewing angle and allows for optimized display design.

One aspect of the invention relates to a portable communication device that includes a housing and a display disposed within the housing. The display includes an image-forming device that provides an image in a first image plane and an image-lifting device disposed above the image-forming device, wherein the image-lifting device shifts the image to a second image plane disposed above the first image plane.

According to another aspect, the image-lifting device is a fiber optic faceplate.

According to another aspect, the fiber optic face plate has a thickness of about 0.8 millimeters to about 3.0 millimeters.

According to another aspect, the image-lifting device has a top surface that is substantially co-planar with a portion of the housing.

According to another aspect, the image-forming device is a liquid crystal display (LCD).

According to another aspect, the display has a viewing angle of at least about ±40 degrees in any direction.

According to another aspect, the portable communication device is a mobile telephone.

According to another aspect, the portable communication device further includes at least one secondary display within the housing.

According to another aspect, the at least one secondary display includes an image-lifting device.

According to another aspect, the at least one secondary display includes an image-forming device.

According to another aspect, the at least one secondary display is optically coupled to a portion of the display.

According to another aspect, the at least one secondary display is optically coupled to a portion of the display via a plurality of fiber optic elements.

According to another aspect, the at least one secondary display is adjacent at least one key within a functional keypad or an alphanumeric keypad.

According to another aspect, the portable communication device further includes a plurality of secondary displays, with each secondary display being adjacent at least one key within a functional keypad or an alphanumeric keypad and including an image-lifting device.

According to another aspect, the at least one secondary display is integrated into at least one key within a functional keypad or an alphanumeric keypad.

According to another aspect, the at least one key is comprised of the image-lifting device.

Another aspect of the invention relates to a display for a portable communication device that includes an image-forming device that forms an image in a first plane and an image-shifting device that shifts the image to a second plane.

According to another aspect, the second plane is above and substantially parallel to the first plane.

According to another aspect, the second plane is substantially co-planar with a top surface of the image-shifting device.

According to another aspect, the image-shifting device is a fiber-optic faceplate.

According to another aspect, the image-shifting device is disposed on the image-forming device.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
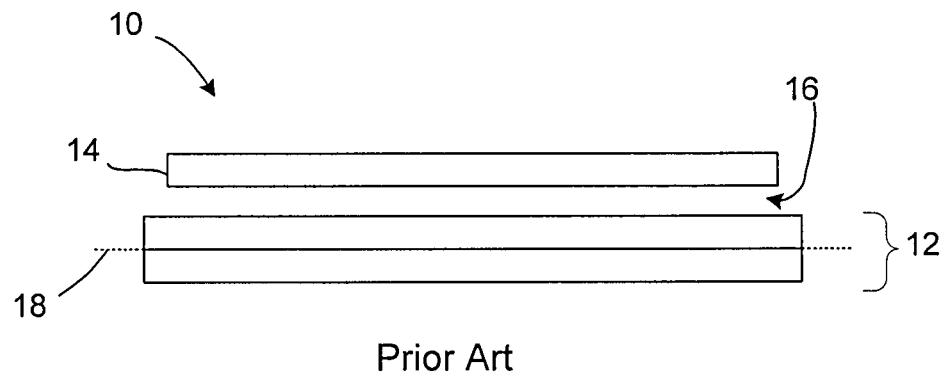
FIG. 1 is a sectional view of a conventional display for a portable communication device.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

As referred to herein, the term "portable communication device" includes portable radio communication equipment. The term "portable radio communication equipment", which herein after is referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and can be applied to any type of electronic equipment capable of being used for voice and/or data communication.

Figure 2:
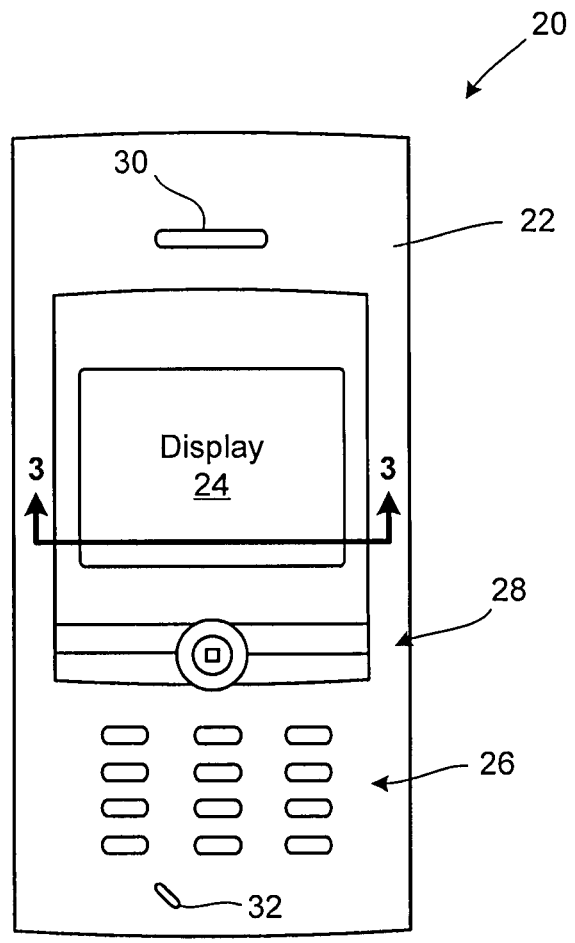
FIG. 2 is a diagrammatic illustration of a portable communication device having a display in accordance with the present invention.

Referring initially to FIG. 2, a portable communication device 20 is shown in accordance with the present invention. In the exemplary embodiment described herein, the portable communication device is a mobile phone 20. Of course, it will be appreciated that the present invention is applicable to other portable communication devices. The mobile phone 20 is shown as having a "block" type of housing 22, but it will be appreciated that other housing types, such as clamshell or slide-type housings may be utilized without departing from the scope of the present invention.

The mobile phone 20 includes a display 24, an alphanumeric keypad 26, functional keys 28, a speaker 30 and a microphone 32. The alphanumeric keypad 26 and the functional keys 28 facilitate controlling operation of the mobile phone 20 by allowing for entry of alphanumeric information, such as telephone numbers, phone lists, contact information, notes and the like. The functional keys 28 typically facilitate navigation through various user menus including initiating and conducting phone calls and other communications. The display 24 displays information to a user, such as recorded digital media, e.g., recorded photos and videos, operating state, time, phone numbers, contact information and various navigational menus, which enable the user to utilize the various features of the mobile phone 20. Artisans will appreciate that the mobile phone 20 further includes suitable circuitry and software for performing various functionality. The circuitry and software of the mobile phone is coupled with input devices, such as the alphanumeric keypad 26, the functional keys 28 and the microphone 32, as well as to the output devices, including the display 24 and the speaker 30.

Figure 3:
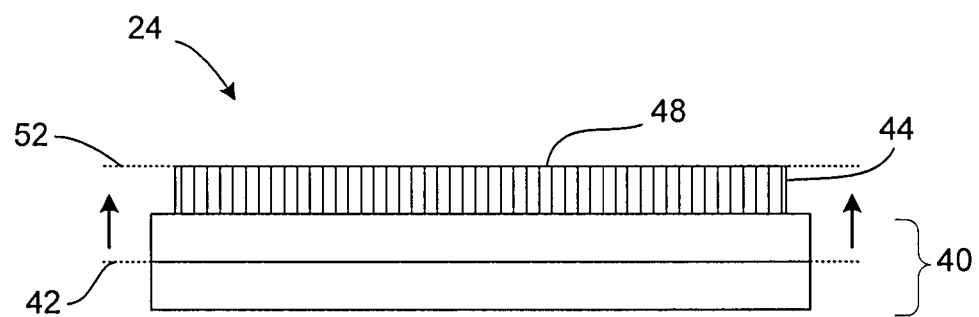
FIG. 3 is a sectional view of FIG. 2 taken along line 3-3.

Referring now to FIG. 3, a display 24 is shown in accordance with the present invention. The display 24 includes an image-forming device 40 that provides a two-dimensional image in pixel form, with pixels typically arranged in rows and columns. In a preferred embodiment, the image-forming device 40 is a liquid crystal display (LCD), however, the image forming device can include, but is not limited to, light emitting diodes (LEDs), organic LEDs (OLEDs), polymeric LEDs (PLEDs) and the like. In addition, other image-forming devices may be employed without departing from the scope of the present invention.

It will be appreciated that the image-forming device 40 forms an image at a first image plane 42 in response to an appropriate data signal. As used herein, the term "image plane" includes a plane commonly at right angles to an optical axis at which a sharp image is formed. Stated differently, the term "image plane" includes an imaginary plane on which an object is projected. Artisans will have additional understandings of the term "image plane" that are contemplated within the scope of the present invention. Similar to the conventional display 10 described in connection with FIG. 1, the display 24 depicted in FIG. 3 includes an image-forming device 40 that forms an image in a first image plane 42 that is generally below a surface of the housing.

In the illustrated embodiment, the display 24 includes an image-lifting device (also referred to herein as an image-shifting device) 44. In a preferred embodiment, the image-lifting device 44 is disposed on or over the image-forming device 40 such that no air gap exists between the image-forming device 40 and the image-lifting device 44. Alternatively, the image-forming device 40 and the image-lifting device 44 can be configured such that an air gap (or an intervening layer) exists between the two. The image-lifting device 44 includes a top surface 48, which in one embodiment, is generally co-planar with a top or outer surface of the mobile phone housing 22.

As illustrated in FIG. 3, the image-lifting device 44 is configured to lift or otherwise shift the image plane of the image formed by the image-forming device 40 from a first or lower image plane 42 to a second or higher image plane 52 (the shift being represented by the arrows in FIG. 3). It will be appreciated that by lifting or otherwise shifting the image plane from a first image plane 42 that is within or otherwise below an outer surface of the mobile phone housing to a second plane 52 that is generally adjacent a top surface 48 of the image-lifting device 44, e.g., an image plane 52 that is substantially or generally co-planar with a top or outer surface of the phone housing, the viewing angle of the display is increased greatly. This increased viewing angle will allow a user to see what is on the display from virtually any viewing angle. It will be appreciated that, depending upon the material and configuration of the image-lifting device, the viewing angle may range from about ±10 degrees to about ±90 degrees.

Figure 4:
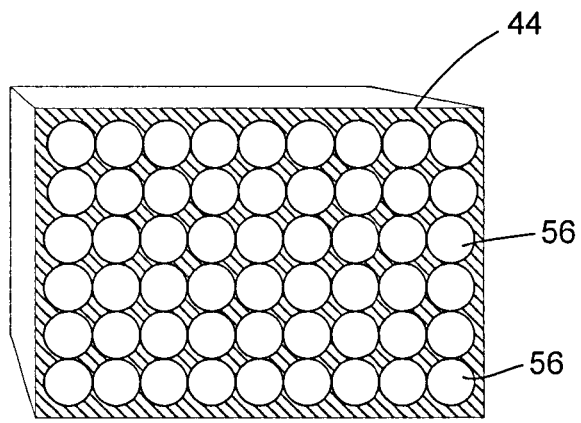
FIG. 4 is an enlarged view of a portion of an image-lifting device in accordance with the present invention.

The image-lifting device 44 is configured to act as a light conduit, and, therefore, as an image conduit, to shift the image plane from a first location 42 to a second location 52. In a preferred embodiment, the image-lifting device 44 is a fiber optic faceplate. As shown in FIG. 4, the fiber optic faceplate can include a plurality of optical elements 56, e.g., fiber optic elements (also referred to as light pipes), that are fused together in a desired configuration. Artisans will appreciate that each fiber optic element includes a core and an envelope surface, and the resultant viewing angle is determined based on the light breaking index between the core and the envelope.

In one embodiment, the optic fibers 56 are arranged in a square pack in which the fibers are arranged in regular rows and columns. It will be appreciated that the fibers may be arranged in a plurality of configurations without departing from the scope of the present invention. In addition, while the optic fibers 56 are depicted as having a circular cross-section, it will be appreciated that fibers of other cross-sectional geometries may be employed without departing from the scope of the present invention. In one embodiment, a suitable fiber optic faceplate can be obtained from Schott Scandinavia AB or Schott Fiber Optics.

The fibers 56 of the fiber optic faceplate 44 can be of any size suitable for use with an image-forming device to lift or otherwise shift an image from a first image plane 42 to a second image plane 52. For example, in the case of fibers having a circular cross-section, the diameter of each fiber can range from about one micron (or less) to about one millimeter (or more). In one embodiment, the fibers are sized such that one fiber is provided for each pixel of the image-forming device. Alternatively, the fibers can be sized differently, such that their size does not correspond with the pixels in the image-forming device on a one-to-one ratio. In one embodiment, a portion of the image-lifting device can be configured to lift and magnify a portion of the image provided by the image-forming device.

In a preferred embodiment, the image-lifting device 44 has a thickness that is suitable to provide protection for the image-forming device 40 disposed there below, without unduly increasing the weight of the display (and the mobile phone). For example, the image-lifting device may have a thickness of about 0.8 millimeters to about 3.0 millimeters depending upon the surrounding housing. Alternatively, the image-lifting device may have a greater thickness if the image-forming device is mounted deep within the housing. Further, it will be appreciated that the image-lifting device can be made of a variety of suitable materials, including, but not limited to fused silica and multi-component glass or fiber glass. In the case of a fiber optic faceplate, the optic fibers are fused together and include interstitial fillers. In one embodiment, the material and/or configuration of the image-lifting device is chosen to minimize or otherwise reduce refraction and/or internal reflections, e.g., by coating a top or outer surface of the image-lifting device with a suitable antireflective layer.

Figure 5:
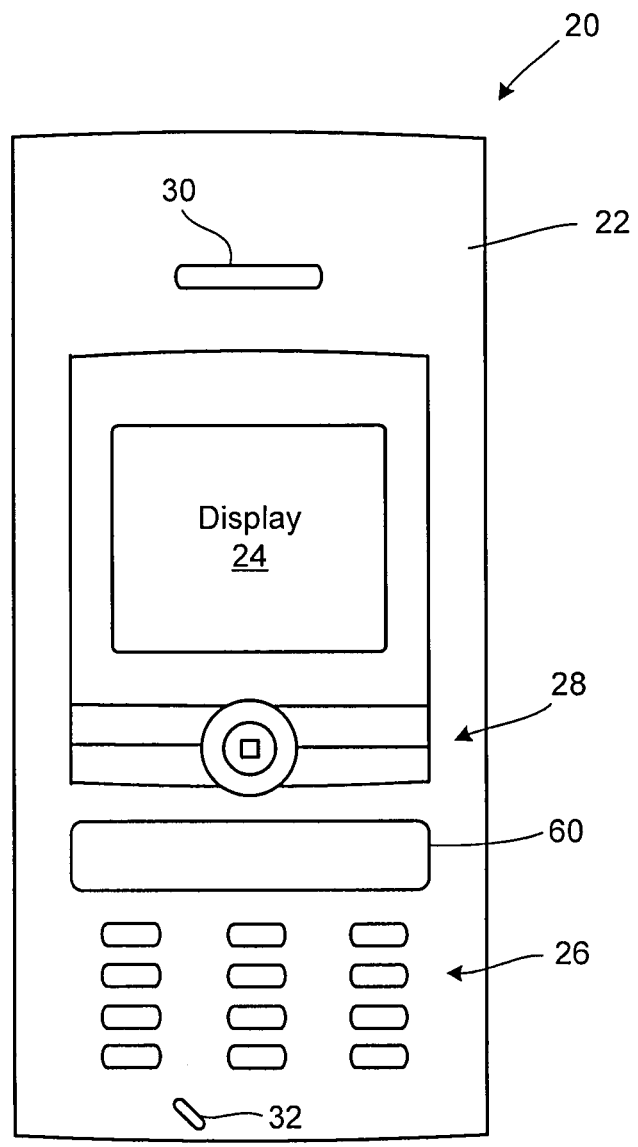
FIG. 5 is a diagrammatic illustration of a portable communication device in accordance with an exemplary embodiment of the present invention.
Figure 6:
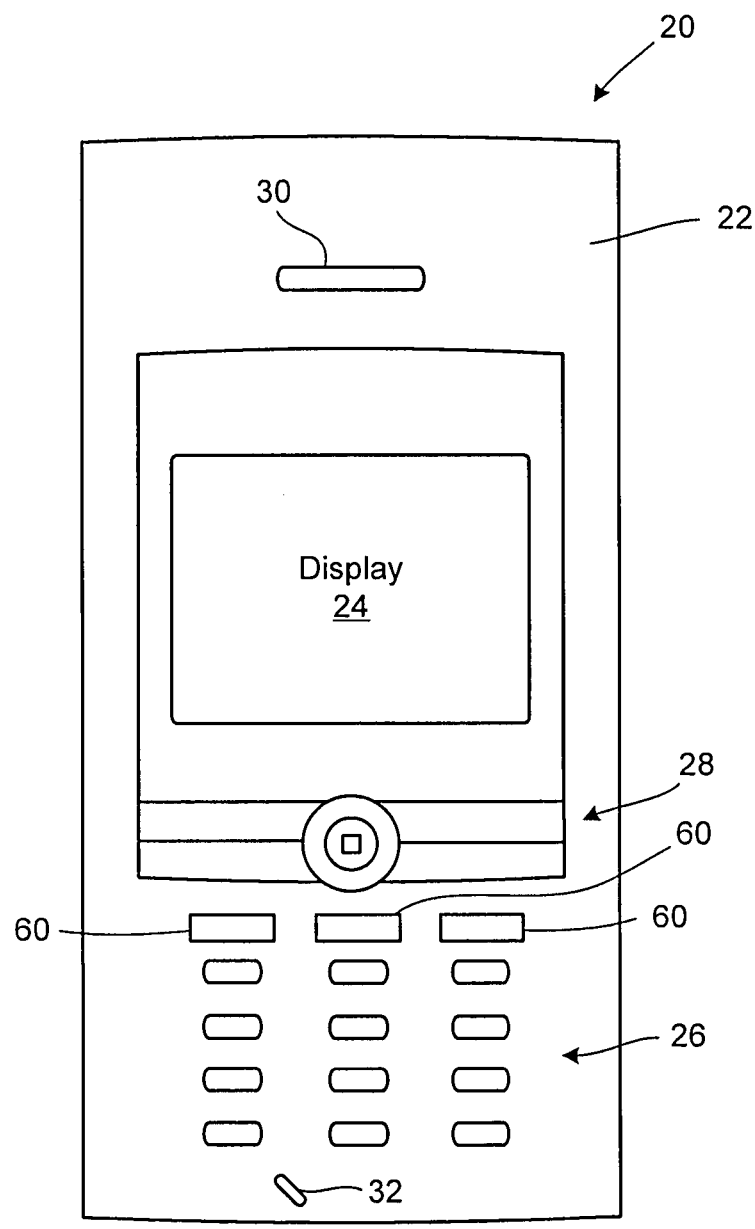
FIG. 6 is a diagrammatic illustration of a portable communication device in accordance with another exemplary embodiment of the present invention.
Figure 7:
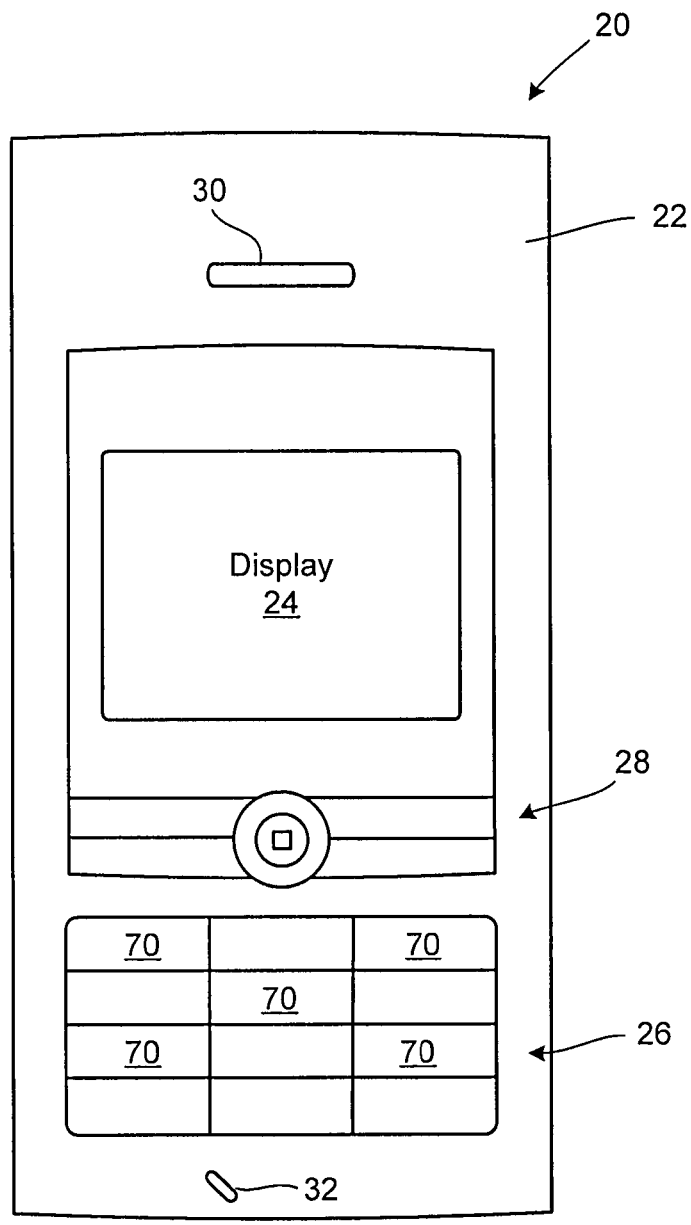
FIG. 7 is a diagrammatic illustration of a portable communication device in accordance with another exemplary embodiment of the present invention.

With reference now to FIG. 5-7, several alternative embodiments of portable communication devices 20, such as mobile phones, including one or more displays in accordance with the present invention are provided. With reference now to FIG. 5, a portable communication device 20 includes a housing, a plurality of input devices, e.g., an alphanumeric keypad 26, functional keys 28 and a microphone 32, as well as output devices, including a display 24 and a speaker 30. The display 24, which may be referred to herein as a main display is of the type described more fully above with reference to FIGS. 2-4. That is, the display includes an image-forming device and an image-lifting device disposed on or over the image-forming device.

In the illustrated embodiment, the portable communication device 20 includes a secondary display 60. The secondary display 60 is disposed between the functional keys 28 and the alphanumeric keypad 26, however, it will be appreciated that one or more secondary displays can be disposed at various other locations within the portable communication device. As is described above, the image-lifting device, in one embodiment, makes use of optic fiber elements. Use of fiber optic technology can allow for image-shifting from an area adjacent the main display 24 to one or more other areas on the portable communication device, such as an area containing a secondary display 60.

Shifting or transfer of light representative of an image can be accomplished using fiber optic members that are a part of or configured to work in conjunction with the fiber optic members that are a part of the image-lifting device. As such, it may be possible for the main display 24 to be reduced in size by including a secondary display 60 somewhere else on the phone housing, e.g., in a location within the housing that typically is not used for image display. It will be appreciated that utilization of a secondary display 60 may also serve to reduce the overall size of the portable communication device. In an exemplary embodiment, the portable communication device can be operated such that certain data or information is displayed on the secondary display 60. For example, stock quotes, sports scores and the like may be scrolled along or otherwise displayed on the secondary display in a constant fashion without detracting from or otherwise distracting a user from the information displayed on the main display. In a preferred embodiment, the secondary display will include an image-lifting element such as that described above with reference to FIG. 3 and FIG. 4. In one embodiment, optic fiber technology is utilized to shift or otherwise transfer a portion of an image away from the main display for viewing via the secondary display 60.

Referring now to FIG. 6, an alternative embodiment of a portable communication device 20, such as a mobile phone, is provided. In the embodiment illustrated in FIG. 6, the mobile phone 20 includes a first or main display 24, such as the displays described more fully above, in conjunction with several secondary displays 60. In this embodiment, the secondary displays 60 include one or more relatively small displays that are placed above, below or adjacent to one or more of the keys or buttons within the alphanumeric keypad 26.

In the illustrated embodiment, several secondary displays 60 are disposed above several keys or buttons within the alphanumeric keypad 26. In one embodiment, each secondary display includes an image-forming device, such as the image-forming device described above with reference to FIGS. 2-4, and an image-lifting device, such as the image-lifting device described above with reference to FIGS. 2-4. Use of secondary displays 60 provides for space saving with respect to the main display 24 in that various display information can be provided away from the main display 24, and with a wide viewing angles so that the user does not have to look into the main display because display information within the secondary displays is listed or otherwise shifted to the top surface of the phone.

Another advantage of this embodiment resides in the applicability to changing the functionality associated with each button or key beneath each secondary display 60. For example, in a multimedia mode the mobile phone may function as an MP3 player for playing music, videos or the like. In this multimedia mode, for example, each secondary display can be configured to show a certain functional significance associated with the corresponding button, e.g., a play button, a pause button, and a stop button. In another mode, a different functional significance could be associated with each key adjacent a given secondary display. It will be appreciated that use of such secondary displays 60 prevents the main display 24 from being crowded with additional information not related to the basic functionality associated with the mobile phone.

In an alternative embodiment, rather than including an individual image-forming device within each secondary display, optical fibers can be used to route a portion of an image from the main display 24 to each secondary display 60. In this embodiment, each secondary display would include an image-lifting device, such as those described above with reference to FIGS. 3 and 4 that optically couples with optical fibers running from the main display. Of course, it will be appreciated that the number, geometry and/or configuration of each secondary display may be variable and optimized depending on the portable communication device.

Referring to FIG. 7, another alternative embodiment of a portable communication device 20, such as a mobile phone, is provided. In this embodiment, keys or buttons 70 within the alphanumeric keypad 26 may be configured to function as individual displays. In this embodiment, each key 70 would include an image-lifting device, such as the fiber optic faceplate described above, in conjunction with either individual image-forming devices, such as those described above, or a portion of the main display 24 via by appropriate fiber optic coupling. As discussed above with reference to FIG. 6, an embodiment in which one or more of the keys 70 functions as an individual or secondary display makes available additional display space on the mobile phone away from the main display 24. It will be further appreciated that use of image-lifting devices, e.g., fiber optic faceplates, on or below the keys 70 moves display information to a top surface of the mobile phone, thereby increasing the viewing angle and ease of viewing by a user.

As discussed above with reference to FIG. 6, the embodiment illustrated in FIG. 7 is operable to provide dynamic keys 70 in which the functionality of the keys can be changed depending on the mode in which the phone is being operated. For example, in a multimedia mode where the phone functions as an MP3 player for playing music, videos or the like, one or more of keys 70 can be dynamically changed from, for example, alphanumeric keys to multimedia mode functional keys, e.g., a play button, a pause button, a stop button or the like. While FIG. 7 depicts an embodiment in which keys within the alphanumeric keypad are provided as secondary displays, it will be appreciated that one or more of the functional keys 28 can be configured as a secondary display in accordance with any of the embodiments illustrated herein.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A portable communication device comprising:
  a housing;
  a first display unit disposed within the housing, the first display unit comprising:
    an image-forming device that provides an image in a first image plane; and
    an image-lifting device disposed above the image-forming device, wherein the image-lifting device shifts the image to a second image plane disposed above the first image plane;
  wherein the first display unit has a viewing angle of at least about $\forall 40$ degrees in any direction; and
  at least one secondary display unit within the housing, wherein the at least one secondary display unit includes an image lifting device, and the at least one secondary display unit is optically coupled to a portion of the first display unit.

2. The portable communication device according to claim 1, wherein the image-lifting device is a fiber optic faceplate.

3. The portable communication device according to claim 2, wherein the fiber optic face plate has a thickness of about 0.8 millimeters to about 3.0 millimeters.

4. The portable communication device according to claim 1, wherein the image-lifting device has a top surface that is substantially co-planar with a portion of the housing.

5. The portable communication device according to claim 1, wherein the image-forming device is a liquid crystal display (LCD).

6. The portable communication device according to claim 1, wherein the portable communication device is a mobile telephone.

7. The portable communication device according to claim 1, wherein the at least one secondary display unit includes an image-forming device.

8. A portable communication device comprising:
  a housing;
  a first display unit disposed within the housing, the first display unit comprising:
    an image-forming device that provides an image in a first image plane; and
    an image-lifting device disposed above the image-forming device, wherein the image-lifting device shifts the image to a second image plane disposed above the first image plane; wherein the first display unit has a viewing angle of at least about $\forall 40$ degrees in any direction; and
  at least one secondary display unit within the housing, wherein the at least one secondary display unit includes an image lifting device and is optically coupled to a portion of the first display unit via a plurality of fiber optic elements, and wherein the secondary display unit is configured to display light representative of an image shifted from the first display unit via the fiber optic elements.

9. The portable communication device according to claim 1, wherein the at least one secondary display unit is adjacent at least one key within a functional keypad or an alphanumeric keypad.

10. The portable communication device according to claim 1, further comprising a plurality of secondary display units, each secondary display unit being adjacent at least one key within a functional keypad or an alphanumeric keypad and including an image-lifting device.

11. A portable communication device comprising: a housing;
a first display unit disposed within the housing, the first display unit comprising:
an image-forming device that provides an image in a first image plane; and
an image-lifting device disposed above the image-forming device, wherein the image-lifting device shifts the image to a second image plane disposed above the first image plane;
wherein the first display unit has a viewing angle of at least about $\forall 40$ degrees in any direction; and
at least one secondary display unit within the housing, wherein the at least one secondary display unit includes an image lifting device, and the at least one secondary display unit is optically coupled to a portion of the first display unit, wherein the at least one secondary display unit is integrated into at least one key within a functional keypad or an alphanumeric keypad.

12. The portable communication device according to claim 11, wherein the at least one key is comprised of the image-lifting device.

13. The portable communication device according to claim 1, wherein the secondary display unit is substantially co-planar with the first display unit.

* * * * *